UNITED STATES PATENT OFFICE.

WILHELM SCHLENK, OF MUNICH, GERMANY, ASSIGNOR TO THE FIRM OF CHEMISCHE FABRIKEN VORM. WEILER-TER MEER, OF UERDINGEN, GERMANY.

PROCESS OF MAKING INDOPHENOL-LIKE CONDENSATION PRODUCTS.

No. 895,689.   Specification of Letters Patent.   Patented Aug. 11, 1908.

Application filed June 15, 1907. Serial No. 379,151. (Specimens.)

*To all whom it may concern:*

Be it known that I, WILHELM SCHLENK, doctor of philosophy, chemist, a subject of the King of Bavaria and the German Emperor, residing at 7 Römerstrasse, Munich, Kingdom of Bavaria, German Empire, have invented new and useful Improvements in the Manufacture of Indophenol-Like Condensation Products, of which the following is a specification.

The present invention is based on the technically remarkable observation, that quinonechlorimid in the dry state or in paste form with or without the aid of condensing agents combines with aromatic amins thus forming colored indophenol-like condensation-products. The method of obtaining these condensation products as described hereunder has the following essential advantage over the process applied hitherto: The resulting bodies are obtained directly in a solid dry form, showing an almost quantitative yield and are in this form essentially more stable than the indophenols obtained after the known process.

The method is put in practice by grinding the chlorimids, dry or in form of pressed cakes, with or without the aid of condensing agents together with amins. The condensation takes place in a short time whereby the temperature of the mixture is more or less raised. It is preferable to avoid by cooling any increase of the temperature above 30 degrees centigrade. It is advisable to add to these mixture indifferent diluting agents, as for instance common salt, Glauber's salt, or infusorial earth. When condensing with amins, mineral acids or acid salts are best used as condensing agents, but organic acids, such as oxalic acid may also be employed. It is in most cases of no account whether amin is used in form of its salt, for instance chlorhydrate, or whether the acid is only added to the reaction mixture. When working after the present process the condensation-products are obtained in a very pure form, only diluted with the inorganic salt, and they possess a relatively good stability. With the aid of sulfid of sodium they are changed into leuco-compounds. It is intended to make use of these products as raw material for sulfurized dyestuffs.

Example 1. 100 parts α-naphthylamin, 400 parts common salt are finely powdered and well mixed. Add gradually 100 parts of dry quinone-chlorimid (or a corresponding quantity of moist pressed cake.) The mixture is then ground (for example in a ball mill) until there is no more unchanged chlorimid present. The condensation product thus obtained, is a violet black powder, showing a red violet color when dissolved in diluted soda lye, violet blue color when dissolved in alcohol and a violet color with a bluish cast when dissolved in concentrated sulfuric acid. The process may be probably represented by the following equation

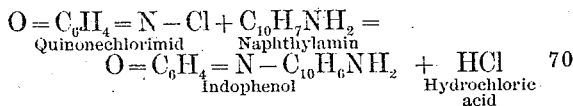

Example 2. Prepare a mixture of 105 parts o-toluidin-chlorhydrate and 500 parts common salt. Add gradually 100 parts quinonechlorimid and grind together as shown in No. 1. The product thus obtained represents a gray black powder showing a violet blue color dissolved in diluted soda lye, a red brown color when dissolved in alcohol and a green blue color when dissolved in concentrated sulfuric acid. The reaction may be probably represented by the following equation:

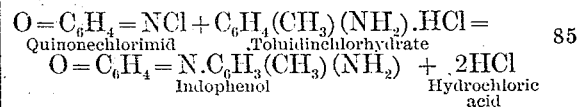

Example 3. 100 parts quinonechlorimid, 120 parts diphenylamin, 85 parts sodium bisulfate, 1000 parts common salt are ground as stated in No. 1. The blue black powder of a greenish cast thus obtained, shows a blue violet color when dissolved in diluted soda lye, a greenish blue color when dissolved in alcohol, and a deep blue color when dissolved in concentrated sulfuric acid. The reaction may be probably represented by the following equation

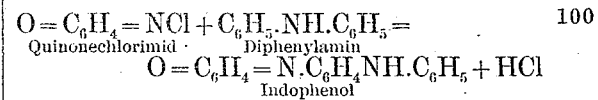

I claim:

1. The process for manufacturing indophenol-like condensation products which consists in grinding chlorinated quinoneimids with aromatic amins.

2. The process for manufacturing indophenol-like condensation products which consists in grinding chlorinated quinoneimids with aromatic amins and an inorganic indifferent diluent material.

In testimony whereof I have signed my name to this specification in the presence of two subscribing witnesses.

WILHELM SCHLENK.

Witnesses:
LOUIS F. MUELLER,
GEORG KÖRNER.